United States Patent [19]

Patrick et al.

[11] Patent Number: 5,108,020

[45] Date of Patent: Apr. 28, 1992

[54] APPARATUS FOR CARRYING SKIS

[76] Inventors: Jerry T. Patrick; Catherine A. Patrick, both of 235 Reflections Dr., #26, San Ramon, Calif. 94583

[21] Appl. No.: 653,144

[22] Filed: Feb. 11, 1991

[51] Int. Cl.⁵ .......................... B60R 9/00; B62D 43/00
[52] U.S. Cl. ................................ 224/319; 224/42.06; 224/42.13; 224/324
[58] Field of Search ................ 224/42.03 R, 42.04, 224/42.06, 319, 42.12, 42.13, 42.15, 42.16, 42.18, 42.19, 324

[56] References Cited

U.S. PATENT DOCUMENTS

| | | | |
|---|---|---|---|
| 1,590,972 | 6/1926 | Green | 224/42.13 |
| 1,624,493 | 4/1927 | Malm | 224/42.13 |
| 1,693,922 | 12/1928 | Herd | 224/42.13 |
| 1,726,149 | 8/1929 | Harryhausen | 224/42.13 |
| 3,504,405 | 4/1970 | Elliott-Smith | 224/247 |
| 3,854,641 | 12/1974 | Kohls | 224/321 |
| 3,972,457 | 8/1976 | Kesler | 224/42.42 |
| 4,078,708 | 3/1978 | Mayer | 224/273 |
| 4,171,759 | 10/1979 | Wnek | 224/42.01 |
| 4,189,074 | 2/1980 | Davies | 224/42.13 |
| 4,278,192 | 7/1981 | Sazegar | 224/315 |
| 4,294,387 | 10/1981 | Wnek | 224/315 |
| 4,372,470 | 2/1983 | Dallaire | 224/324 |
| 4,785,980 | 11/1988 | Redick | 224/42.03 A |
| 4,817,838 | 4/1989 | Kamaya | 224/319 |
| 4,948,021 | 8/1990 | Murphy et al. | 224/42.13 |
| 4,993,610 | 2/1991 | Abretske et al. | 224/42.13 |

FOREIGN PATENT DOCUMENTS

| | | | |
|---|---|---|---|
| 148495 | 1/1937 | Australia | 224/42.03 R |
| 688407 | 2/1940 | Fed. Rep. of Germany | 224/42.03 R |
| 349709 | 6/1937 | Italy | 224/42.03 R |
| 244678 | 10/1986 | Japan | 224/42.03 R |
| 200882 | 1/1939 | Switzerland | 224/42.03 R |

*Primary Examiner*—Henry J. Recla
*Assistant Examiner*—Keith Kupferschmid
*Attorney, Agent, or Firm*—Thomas R. Lampe

[57] ABSTRACT

Apparatus for carrying skis on a vehicle having a rear mounted wheel assembly. The wheel assembly projects further away from the rear of the vehicle than the skis held by the apparatus project away from the rear of the vehicle so that the wheel assembly will protect the skis against rear end collision impact.

11 Claims, 4 Drawing Sheets

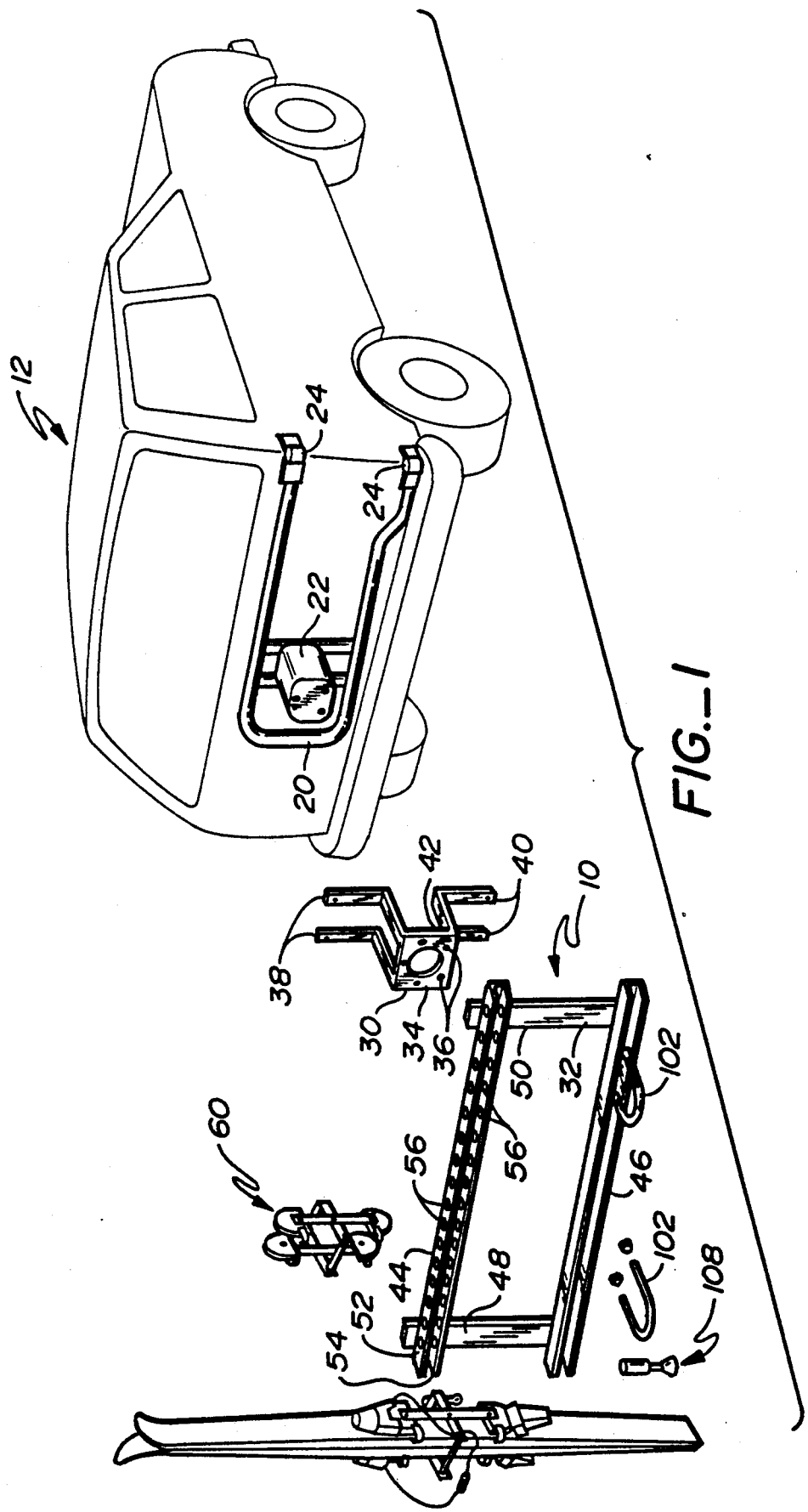
FIG._1

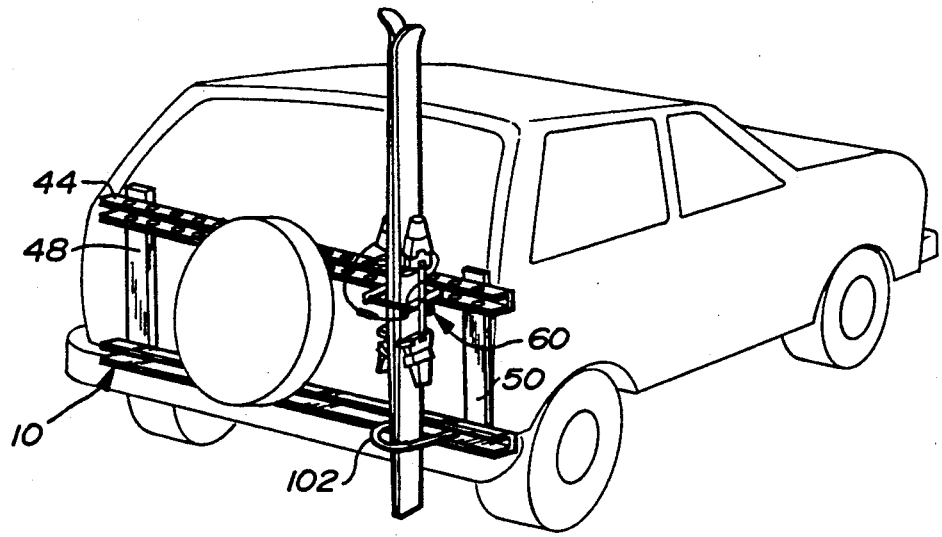
FIG._1A
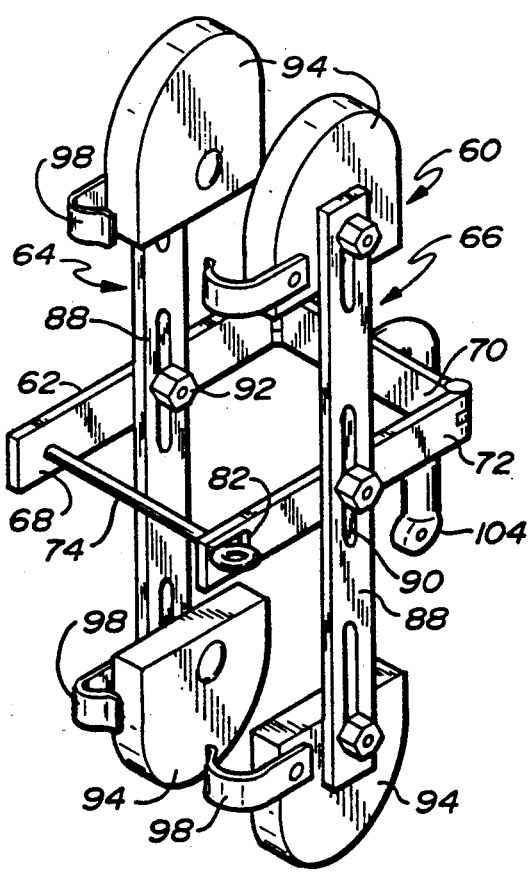
FIG._3
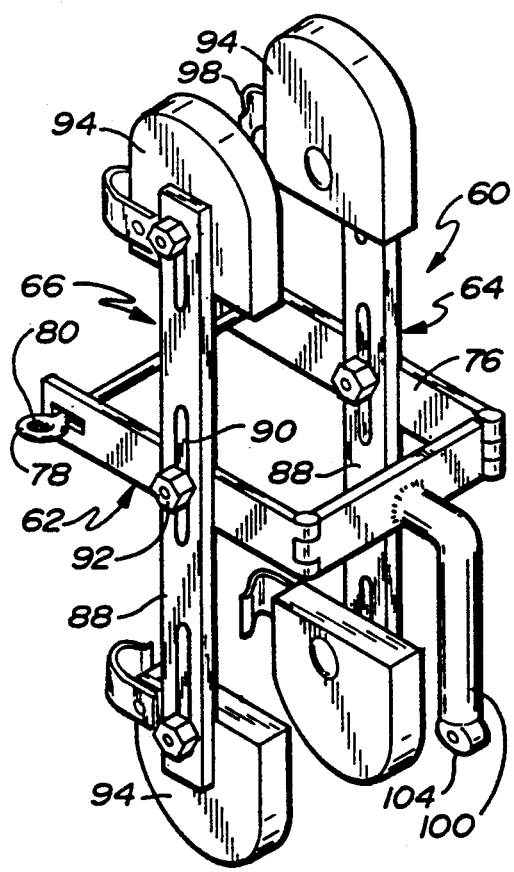
FIG._4

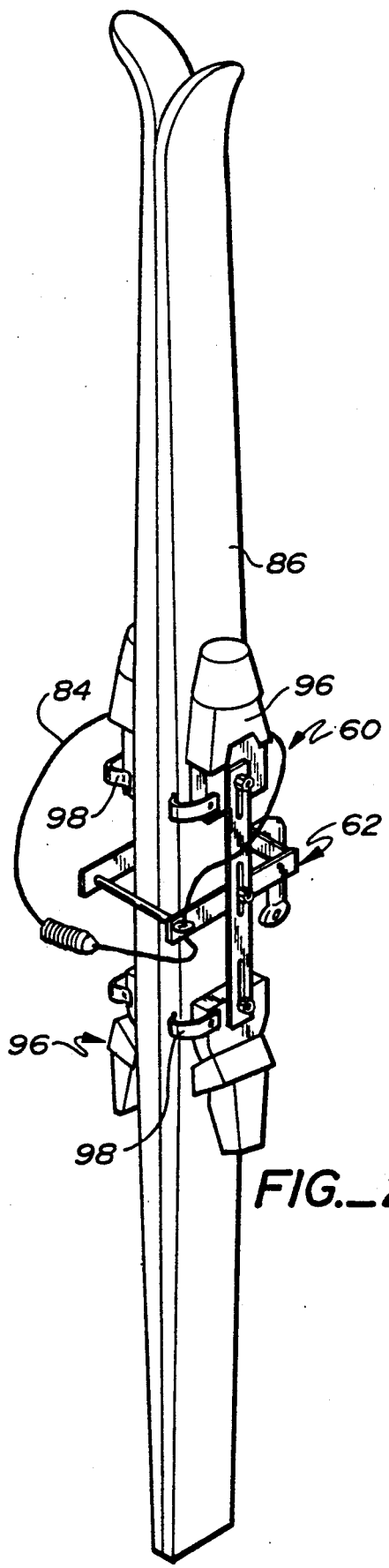
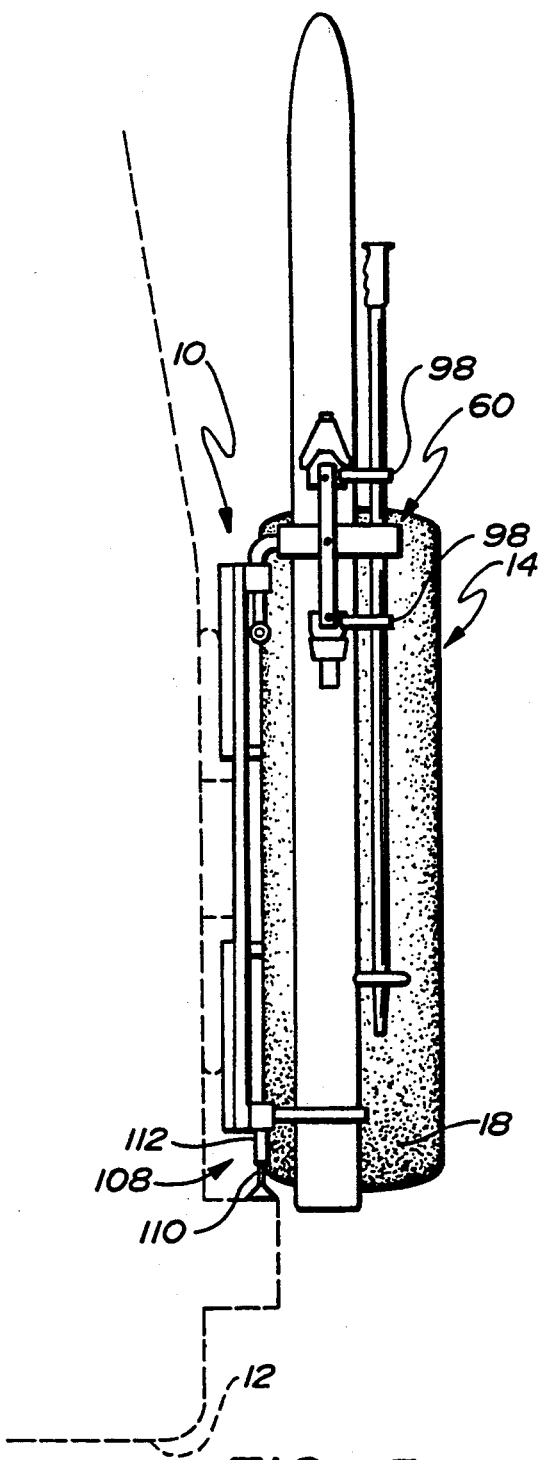
FIG._2
FIG._5

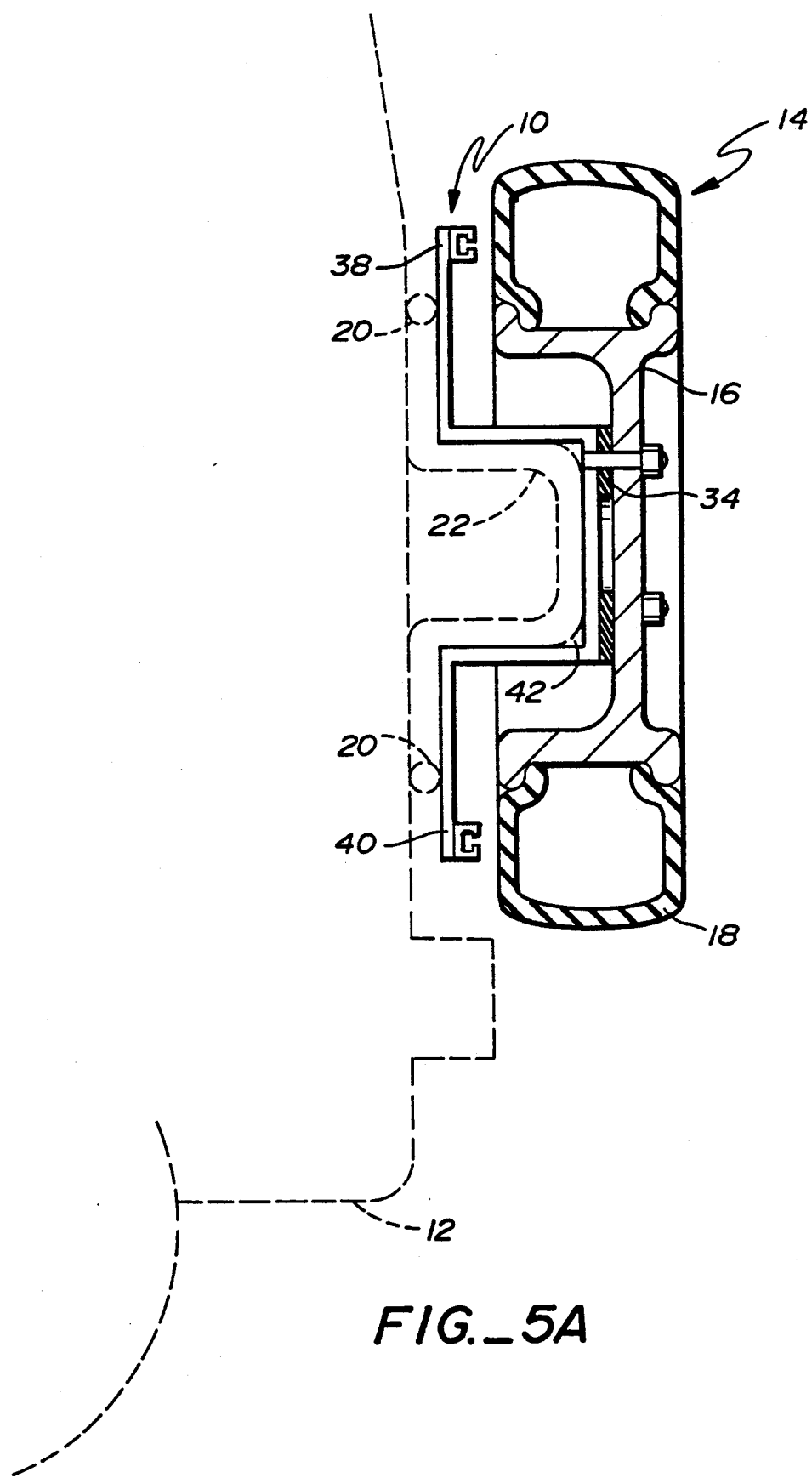
FIG._5A

APPARATUS FOR CARRYING SKIS

TECHNICAL FIELD

This invention relates to apparatus for carrying skis. More particularly, the apparatus is to be utilized in combination with a vehicle having mounting means disposed at the rear of the vehicle for mounting a wheel assembly with the wheel assembly projecting rearwardly of the vehicle. The apparatus affords protection to the skis against impact by positioning the wheel assembly further away from the rear of the vehicle than the skis project away from the rear of the vehicle. The apparatus also includes holder means for transporting skis to and from the vehicle.

BACKGROUND ART

A wide variety of ski carriers have been devised including ski carriers which are utilized to carry skis on vehicles. Examples of prior art devices of this nature are disclosed in the following patents: U.S. Pat. No. 3,854,641 issued Dec. 17, 1974 to Kohls, U.S. Pat. No. 4,171,759 issued Oct. 23, 1979 to Wnek, U.S. Pat. No. 4,372,470 issued Feb. 8, 1983 to Dallaire, U.S. Pat. No. 4,817,838 issued Apr. 4, 1989 to Kamaya, U.S. Pat. No. 3,972,457 issued Aug. 3, 1976 to Kesler, U.S. Pat. No. 4,785,980 issued Nov. 22, 1988 to Redick, and U.S. Pat. No. 4,078,708 issued Mar. 14, 1978 to Mayer.

The above-identified patents are merely representative of ski carrier means to be employed with vehicles. It will be appreciated that a wide variety of ski racks or carriers are so constructed as to be placed in a number of positions relative to the vehicle including upon the roof top or at the rear of the vehicle. While rear mounting of a carrier on a vehicle has advantages, one serious drawback does exist with respect to arrangements of this type in that skis located at the rear of vehicles are subject to damage in the event of a rear end collision.

The apparatus of the present invention is so constructed as to greatly reduce the chances of damage to the skis due to rear end collision. More particularly, the apparatus of the present invention is adapted to be utilized with vehicles of the type having rear mounted wheel assemblies. Such vehicles are widely employed by skiing enthusiasts and the apparatus of the present invention may be readily mounted on such vehicles and utilize the wheel assembly to afford protection to the skis as well as to the ski carrying apparatus itself.

Another feature of the present invention relates to its use of ski holders which function not only to attach the skis to the rest of the carrier apparatus but also operate as convenient means for transporting the skis to and from the vehicle. That is, the holder means incorporated in the apparatus fulfills a two-fold function, greatly contributing to the convenience of the apparatus. Dual purpose ski holders are generally known, as shown, for example, in U.S. Pat. No. 4,278,192 issued Jul. 14, 1981 to Sazegar and U.S. Pat. No. 4,294,387 issued Oct. 13, 1981 to Wnek, but the apparatus of the present invention particularly lends itself to deployment on the back of a vehicle and is characterized by its relative simplicity and low cost.

DISCLOSURE OF INVENTION

The apparatus for carrying skis disclosed and claimed herein is to be utilized in combination with a vehicle having mounting means disposed at the rear of the vehicle for mounting a wheel assembly with the wheel assembly projecting rearwardly of the vehicle.

The apparatus includes support means attachable to the mounting means, holder means for holding skis, and connector means for connecting the holder means to the support means at a preselected location on the support means. The wheel assembly projects further away from the rear of the vehicle than the skis project away from the rear of the vehicle when the support means is attached to the mounting means whereby the wheel assembly affords protection to the skis against impact.

The mounting means comprises a mounting frame connected to the vehicle and a mounting element affixed to the mounting frame and projecting therefrom. The support means defines a recess for receiving the projecting mounting element. The support means comprises a first support member and a second support member connected to the first support member. The first support member defines the recess and the second support member extends outwardly from opposed sides of the first support member and the recess. The second support member includes generally horizontally disposed spaced structural elements. The connector means connects the holder means to at least one of the structural elements.

The connector means employed in the present apparatus includes a projection on the holder means. The at least one structural element defines a plurality of spaced apertures for selectively receiving the projection.

The holder means of the apparatus includes a primary holder portion defining an aperture for accommodating a pair of skis therein and two auxiliary holder portions connected to the primary holder portion and spaced from one another. Each auxiliary holder portion includes two spaced ski retention elements of a size and configuration to enter into and bear against the interiors of the heel and toe ends of bindings of skis accommodated within the primary holder portion aperture as well as adjustment means for adjusting the spacing between the ski retention elements.

Other features, advantages, and objects of the present invention will become apparent with reference to the following description and accompanying drawings.

BRIEF DESCRIPTION OF DRAWINGS

FIG. 1 is an exploded perspective view of the apparatus constructed in accordance with the teachings of the present invention and a vehicle to which the apparatus is to be attached;

FIG. 1A is a perspective view showing the apparatus attached to the vehicle;

FIG. 2 is an enlarged, perspective view illustrating a pair of skis in operative association with the holder means of the present apparatus;

FIG. 3 is an enlarged frontal perspective view of the holder means;

FIG. 4 is an enlarged rear perspective view of the holder means;

FIG. 5 is a side view illustrating the position assumed by the apparatus and a pair of skis associated therewith when attached to the vehicle; and FIG. 5A is an enlarged cross-sectional view illustrating the mode of attachment of the apparatus to the vehicle and its operative association with a wheel assembly.

BEST MODE FOR CARRYING OUT THE INVENTION

Referring now to the drawings, apparatus constructed in accordance with the teachings of the present invention is generally designated by reference numeral 10. Apparatus 10 is attached to a vehicle 12. Vehicle 12 is of the type having a rear mounted wheel assembly 14. Wheel assembly 14, as is conventional, includes a wheel member 16 and a tire 18 about the wheel member.

Vehicle 12 has mounting means disposed at the rear of the vehicle for mounting the wheel assembly with the wheel assembly projecting rearwardly of the vehicle. The mounting means comprises a mounting frame 20 and a mounting element 22 affixed to the mounting frame and projecting therefrom. Mounting frame 20 is connected to the body of vehicle 24 by hinge elements 24. Such an arrangement is well known in the prior art as is the construction of the mounting means itself.

Apparatus 10 is to be attached to the mounting element 22 after removal of the wheel assembly 14 therefrom. In FIG. 1 the wheel assembly 14 has in fact been removed from the mounting means and is not illustrated.

Apparatus 10 includes support means comprising a first support member 30 and a second support member 32, each of said support members being constructed of any suitable material such as steel.

First support member 30 includes a plate 34 having a plurality of spaced apertures 36 formed therein. Extending from plate 34 and secured thereto by any desired expedient are leg elements, more particularly, upper leg elements 38 and lower leg elements 40 which are connected together and define a generally V-shaped configuration as shown in FIG. 5A. Together the plate 34 and leg elements 38, 40 define a recess 42 which is so dimensioned as to receive therein mounting element 22. Lug bolts pass through wheel member 16, through plate 34, and threadedly engage mounting element 22 or nuts associated therewith.

The second support member 32 is of generally rectangular configuration including generally horizontally disposed spaced structural elements 44, 46, said structural elements being affixed to vertical members 48, 50.

Structural element 44 is in the form of a channel having a generally U-shaped cross section. The upper and lower panels 52, 54, respectively, of the structural element 44 have spaced apertures 56 formed therein as shown, with the apertures of the upper and lower panels being in registry.

Structural element 46 is also in the nature of a channel having a generally U-shaped cross-sectional configuration; however, the upper and lower panels thereof do not define apertures.

To connect second support member 32 to first support member 30, the structural elements 44, 46 are brought into engagement with leg elements 38, 40 of the first support member. Holes are formed in the ends of leg elements 38, 40 which register with holes (not shown) formed in structural elements 44, 46. Bolts are passed through the registered holes and secured into place by nuts. Of course, any suitable fasteners may be employed for such purpose.

Another component of the present invention is holder means for holding skis, such holder means being generally designated in the drawing by reference numeral 60. Holder means 60 includes a primary holder portion 62 and two auxiliary holder portions 64, 66 connected to the primary holder portion and spaced from one another.

Primary holder portion 62 includes a plurality of interconnected bars 68, 70, 72, 74 defining an aperture 76. Bars 68 and 72 are hingedly connected to the ends of bar 70. Bar 74 is in the shape of a rod which is affixed at one end thereof to bar 68. The other end 78 of bar 74 is enlarged and defines an opening 80. Enlarged end 78 is selectively positionable in a slit 82 formed in bar 72. When the primary holder portion 62 is in its closed configuration illustrated in the drawings, enlarged end 78 is located outside bar 72. A conventional locking cable 84 may be passed through opening 80, as shown in FIG. 2, to retain the primary holder portion in its closed configuration. Upon removal of the locking cable 84 from opening 80, bars 68, 72 may be pivoted relative to bar 70 and enlarged end 78 withdrawn inwardly through slit 82 whereby the primary holder portion 62 is open to receive a pair of skis 86.

Each auxiliary holder portion includes an elongated member 88 having a narrow opening 90 formed therein. Each opening 90 receives therein a threaded boss or stud affixed to bars 68 and 72 and projecting therefrom. Nuts 92 cooperate with the threaded studs and allow the elongated members 88 to be adjusted longitudinally relative to the primary holder portion and secured in the desired position relative thereto. In the arrangement illustrated, the elongated members are of integral construction, however, it will be appreciated that the elongated members may be comprised of separate segments which may be adjusted relative to one another.

Adjustably connected to the opposed ends of each elongated member 88 by a similar stud-nut-narrow opening arrangement are pad-like ski retention elements 94 of a size and configuration to enter into and bear against the interiors of the heel and toe ends of the ski bindings 96, as shown in FIGS. 1, 2 and 5. The ski retention elements are adjusted relative to elongated members 88 and secured in place in the bindings by tightening the nuts relative to the threaded studs associated with the ski retention elements.

Clips 98 formed of spring steel or the like and having curved distal ends are attached to the ski retention elements 94 in the manner illustrated. The clips are deformable and may be used to clamp about ski poles.

A projection 100 in the form of a bar bent ninety degrees is secured to and projects from primary holder portion 62. The projection is for placement in the aligned apertures 56 formed in the upper and lower panels 52, 54 of structural element 44 and functions as connector means for connecting the holder means to mounting frame 20. The lower ends of the skis are positioned in U-shaped stabilizing elements 102 secured to structural element 46. In the arrangement illustrated, the distal ends of stabilizing elements 102 are threaded and nuts are connected thereto to attach the stabilizing elements to structural element 46. It will be appreciated that the stabilizing elements 102 and their associated nuts may be utilized to secure lower leg elements 40 of first support member 30 to structural element 46. An eye 104 is preferably formed at the distal end of projection 100 which may accommodate locking cable 84 to retain the projection in structural element 44.

Wheel assembly 14 is secured to plate 34 of first support member 30 as well as to mounting element 22 by lug bolts which threadedly engage mounting element 22 or nuts associated therewith. When this is accomplished, as ma perhaps best be seen with reference to FIGS. 5 and 5A, the wheel assembly 14 projects further from the rear of the vehicle 12 than does either the apparatus 10 or the skis carried thereby.

In the arrangement illustrated, a jack device 108 having a rotatable screw-type element 110 and a housing element 112 is secured by any suitable expedient, such as welding or mechanical fasteners, to structural element 46 at the end of the structural element located furthest from the hinged end of mounting frame 20. The jack device is disposed between the vehicle bumper and structural element 46 and then lengthened to engage the bumper and provide additional structural support.

It will be appreciated that a plurality of holder means may be utilized in this system and disposed at any desired location relative to the structural elements 44, 46. One or more such holder means may be secured to one or more structural elements by a locking cable.

When the user of the apparatus so desires he or she may completely remove the holder means along with the skis and poles it holds from the structural elements by simply maneuvering the holder means upward. The distal end of projection 100 attached to the holding means may be used as a handle to carry the holder means, skis and poles. If desired, a separate handle (not shown) may be affixed to primary holder portion 62.

We claim:

1. Apparatus for carrying skis, said apparatus adapted to be utilized in combination with a vehicle having mounting means disposed at the rear of said vehicle for mounting a wheel assembly with said wheel assembly projecting rearwardly of said vehicle, said apparatus including support means adapted for attachment to said mounting means, holder means for holding skis, and connector means for connecting said holder means to said support means at a preselected location on said support means, said wheel assembly projecting further away from the rear of said vehicle than the skis project away from the rear of said vehicle when said support means is attached to said mounting means whereby said wheel assembly affords protection to said skis against impact, said mounting means comprising a mounting frame connected to said vehicle and a mounting element affixed to said mounting frame and projecting therefrom, said support means defining a recess adapted for receiving said projecting mounting elements when said support means is attached to said mounting means.

2. The apparatus according to claim 1 wherein said support means comprises a first support member and a second support member connected to said first support member, said first support member defining said recess and said second support member extending outwardly from opposed sides of said first support member and said recess, said second support member including generally horizontally disposed spaced structural elements, said connector means connecting said holder means to at least one of said structural elements.

3. The apparatus according to claim 2 wherein said connector means includes a projection on said holder means, said at least one structural element defining a plurality of spaced apertures for selectively receiving said projection.

4. The apparatus according to claim 3 wherein said holder means includes a primary holder portion and two auxiliary holder portions connected to said primary holder portion and spaced from one another, each said auxiliary holder portion including at least one ski retention element for securement to a ski.

5. The apparatus according to claim 4 wherein said primary holder portion defines an aperture for accommodating a pair of skis therein, said ski retention elements of said auxiliary holder portions receivable in the bindings of skis accommodated within said primary holder portion aperture.

6. The apparatus according to claim 5 wherein each of said auxiliary holder portions includes two spaced ski retention elements and adjustment means for adjusting the spacing between said ski retention elements.

7. The apparatus according to claim 6 wherein each said ski retention element is of a size and configuration to enter into and bear against the interiors of the heel and toe ends of said ski bindings.

8. The apparatus according to claim 6 wherein resilient clips are attached to said ski retention elements for accommodating ski poles.

9. The apparatus according to claim 8 wherein said primary holder portion includes a plurality of interconnected bars defining said aperture, at least some of said bars being selectively disengageable from one another to allow passage of said skis into said aperture.

10. The apparatus according to claim 6 wherein said auxiliary holder portions each comprise an elongated member, said ski retention elements of each auxiliary holder portion being selectively adjustably mounted on said elongated member.

11. The apparatus according to claim 8 wherein the elongated member of each auxiliary holder portion is selectively adjustably mounted relative to said primary holder portion.

* * * * *